GARLINGHOUSE & MOORE.
Hay Raker & Loader.
No. 76,743.    Patented April 14, 1868.
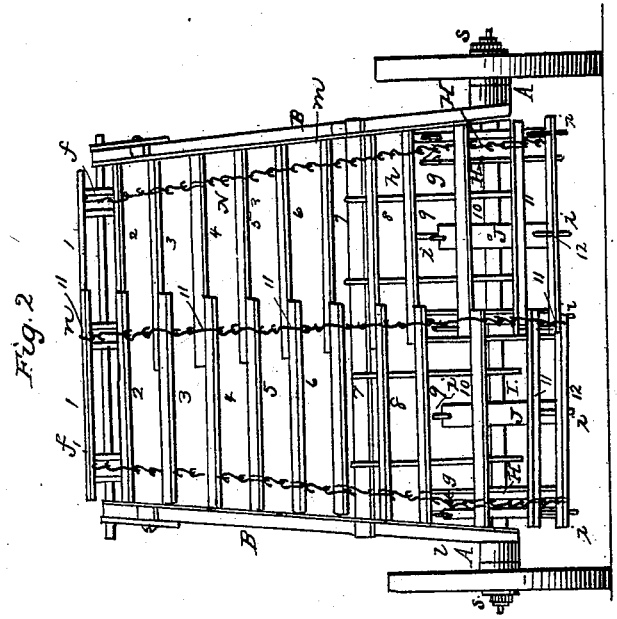
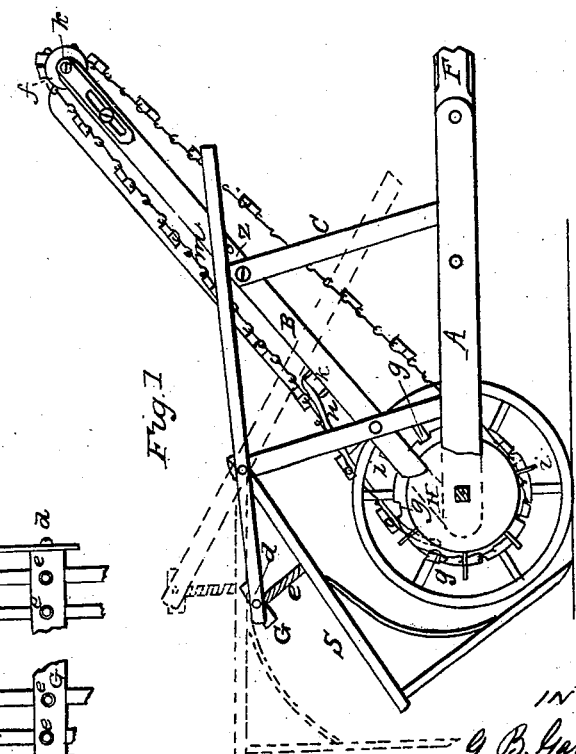

United States Patent Office.

GEORGE B. GARLINGHOUSE AND J. C. MOORE, OF MADISON, INDIANA.

Letters Patent No. 76,743, dated April 14, 1868.

IMPROVEMENT IN HAY-RAKERS AND LOADERS.

*The Schedule referred to in these Letters Patent and making part of the same.*

TO ALL WHOM IT MAY CONCERN:

Be it known that we, GEORGE B. GARLINGHOUSE and J. C. MOORE, both of Madison, in the county of Jefferson, and State of Indiana, have invented new and useful Improvements in Hay-Rakers and Loaders; and we do hereby declare that the following is a full, clear, and exact description thereof, which will enable those skilled in the art to make and use the same, reference being had to the accompanying drawings, forming part of this specification.

This invention relates to that class of machines which are attached to the tail of any ordinary hay-wagon or cart, and, when drawn over the ground, will rake and load the hay on the wagon.

Figure 1 is a side elevation of the machine, with one ground-wheel and a part of the framework broken away.

Figure 2 is a rear elevation with the raking-attachment removed.

Figure 3 shows the construction of the rake.

Similar letters of reference indicate corresponding parts.

A A are the side-frames of the machine; B B are carriers for the endless apron. These carriers are pivoted at the rear end of the frames A A, as shown, so as to admit of being raised or lowered at pleasure, and are held in position by the supports C C. H H' H'' are grooved wheels on the square axle I, over which pass the endless chains N N N. These chains also pass over the sheaves $f f f$ on the shaft $k$, and are kept tight by means of the slotted journal-pieces, as shown.

To these endless chains are attached the slats, numbered 1, 2, 3, &c., consecutively. These slats are fastened firmly at their outer ends to the side chains, but pass loosely through the links $n n n$, &c., on the centre chain, in which they are free to move in the direction of their lengths. The wheels H and H'', being farther apart than the outer two of the sheaves on the shaft $k$, the apron, composed of the chains and slats, contracts in width as it moves upward and over the sheaves, thus allowing the machine to rake over and load from a broader surface of ground than the width of the hay-wagon.

In the flanges of the grooved wheels H H' H'' are notches $g g$, &c., into which the ends of the slats fit loosely, and which operate, when the machine is in motion, to revolve the apron. On the peripheries of these wheels, and the auxiliary wheels J J, may be seen the pins or teeth $i i$, &c., of suitable length, and so placed as to alternate with the slats of the apron. These teeth are for carrying the hay from the heap collected by the rake on to the apron, and to prevent them drawing it down again as they pass over, the guard-fingers $h h h h$, which are attached to the cross-bar K, are bent upward so as to lift the slats as they pass over them, with the hay upon them, clear of the said teeth at the proper time. The ground-wheels of the machine are arranged in the ordinary manner, with the pawls and ratchets $s s$, so that they may be backed without operating the loading-gear.

The raking-attachment is constructed as follows: D D are uprights or supports, attached substantially as shown, through which passes the rod $x$, with a nut on either end. On the extremities of this rod are also pivoted the levers E E, for which it acts as a fulcrum. S S, &c., are the tooth-bars, pivoted or journalled on the bar $x$, and separated by the cylindrical sleeves $o o$, &c. To the outer ends of these bars are attached the rake-teeth, supported by a curved brace, as shown. G is a cross-bar, pivoted at the ends to the levers E E. Through this bar pass the spring-rods $e e$, &c., which are firmly fastened at their lower ends to the tooth-bars S S, &c., and have suitable coil-springs around them, as shown. The spring-rods pass loosely through the bar G, but have heads to prevent their coming out. The springs abut against the bar G.

Each tooth of the rake is independent of the others, and, through the elastic medium of the springs, rises or falls with the inequalities of the ground and any small obstructions.

$m m$ are side-boards, for the double purpose of keeping the hay on the apron, and for pressing the slats toward the centre. F is the pole of the machine, by which it is attached to the hay-wagon.

Operation.

When operated, the machine is attached to the tail of the hay-cart or wagon by a hook and staple or other device, and the rake let down. As the wagon is drawn forward, the ground-wheels, through the pawls and ratchets $s\ s$, revolve the square axle I. This, in turn, revolves the wheels J J and H H' H'', which set the apron in motion. The teeth $i\ i\ i$, &c., take the hay from the rake and deposit it on the apron, which carries it up and drops it on the wagon.

This machine is intended to take the hay and load it either from the swath or windrow.

When not in use, the rake is lifted by means of the levers E E, and held there by the pins $a\ a$, as shown in dotted lines, fig. 1; and when in use, the levers rest on the pins $z\ z$, which keep the rake to the ground.

Having thus described our invention, what we claim as new, and desire to secure by Letters Patent, is—

1. The contracting apron, when constructed to operate, substantially as described, and for the purpose as set forth.

2. The guard, formed of the bar K and fingers $h\ h\ h\ h$, when used in the manner and for the purpose as described.

3. In combination with the above, we claim the mode of lifting the rake and holding it up, in the manner substantially as shown and lescribed.

4. In combination with the first clause, we claim the wheels H H' H'', auxiliary wheels J J, and teeth $i\ i$, &c., or their equivalents, when used substantially in the manner and for the purpose as set forth.

GEO. B. GARLINGHOUSE,
J. C. MOORE.

Witnesses:
 A. M. CONNETT,
 HENRY CONNETT, Jr.